(No Model.)
A. C. BELL.
Cider Mill and Wine Press.
No. 235,198.  Patented Dec. 7, 1880.
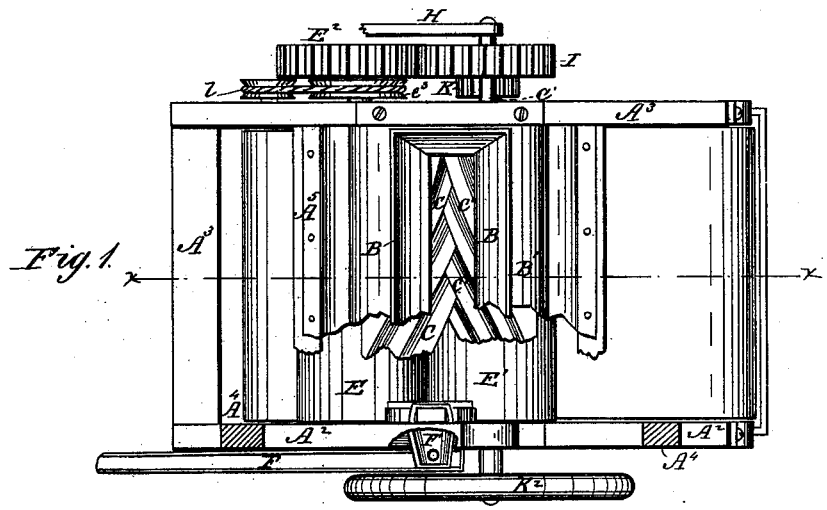
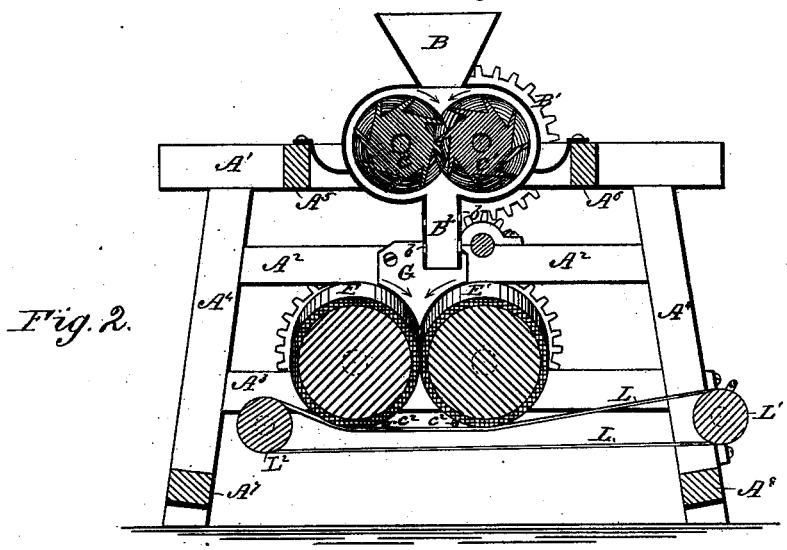
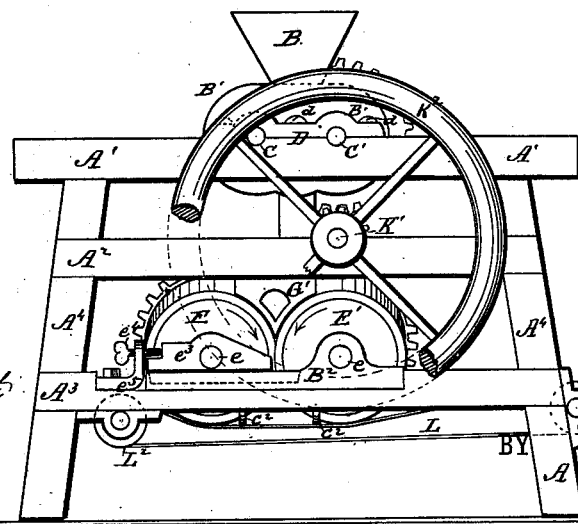
WITNESSES:
W. W. Hollingsworth
W. F. Rown
INVENTOR:
A. C. Bell
BY
ATTORNEYS.

UNITED STATES PATENT OFFICE.

ALEXANDER C. BELL, OF NEW ALEXANDRIA, PENNSYLVANIA.

CIDER-MILL AND WINE-PRESS.

SPECIFICATION forming part of Letters Patent No. 235,198, dated December 7, 1880.

Application filed May 24, 1880. (No model.)

*To all whom it may concern:*

Be it known that I, ALEXANDER C. BELL, of New Alexandria, in the county of Westmoreland and State of Pennsylvania, have invented a new and Improved Cider-Mill and Wine-Press; and I do hereby declare that the following is a full, clear, and exact description of the same.

My invention relates to a machine for making wine and cider from the fruit by a continuous process, whereby the fruit is placed in a hopper and ground, then passed between compression-cylinders slightly inclined, by means of which the juice is extracted from the crushed fruit, and the pomace is carried from the machine by an endless belt arranged beneath the compression-cylinders, while the juice of the fruit flows down the trough formed by the rollers to one side of the machine, where it enters a spout and is conducted away from the machine to a suitable receptacle.

Various improvements in the construction of the details of the machine will be hereinafter fully described, with reference to the accompanying drawings, in which—

Figure 1 is a plan view of the machine with one end of the frame and hopper broken away to show the compression-rollers and their connection with the spout for conducting the wine or cider from the machine; Fig. 2, a longitudinal section in the line $x$ $x$ of Fig. 1, and Fig. 3 a side elevation of the same.

The frame A of the machine is preferably formed upon each side with three rails, A', A², A³, and posts A⁴, to form supports for the ends of three lines of shafting. The side frames are coupled together by cross-braces A⁵ A⁶ A⁷ A⁸.

A hopper, B, and double cylindrical casing B', with a downwardly-projecting spout, B², are made of metal, preferably cast in the form shown, and bolted to the upper rails and cross-bars of the frame.

Two metal cylinders, C C', arranged within the casing B', are provided with parallel shafts $c$ $c'$, journaled upon the upper side of the rails A', and held in place by metal caps D, over the ends of the shaft, secured to the rail by stud-bolts $d$, in a well-known manner. The cylinders C C' are each provided with spirally-arranged knives, extending from one end of the cylinder to the other. In this instance eight knives are employed, and are curved at such a pitch that each blade will make a half-revolution of the cylinder. The knives of the cylinders are twisted in reverse directions, as shown in the drawings, so that they may mesh with each other and cause both of the cylinders to revolve together. The knives may be cast solidly upon the rollers, as shown in the drawings, to represent a fluted outline, or spiral grooves may be cast in the faces of the cylinders, into which spiral blades may be inserted and affixed by any well-known mechanical means. This form of roller will effectually cut and macerate the fruit, and also serve to feed it regularly to the compression-cylinders E E', arranged beneath the cylinders C C', which are slightly inclined from a horizontal position, in order that the juice of the fruit may flow down the inclined trough between the rollers and be delivered to the funnel of a spout, F, arranged close to the ends of the rollers and slightly below the trough of the rollers.

The spout B², arranged beneath the cylinders C C', is perforated upon its sides at $b$, to allow the juice of the fruit to escape freely should the spout become choked. The ground and macerated fruit is delivered by the spout in a line directly above the line of contact or trough between the rollers E E'. These rollers are covered with rubber, either cast or wrapped around the rollers to sufficient depth and secured thereon in a suitable manner, by which means the rollers will be allowed to act with an elastic pressure upon the macerated fruit and yield sufficiently to allow the solid matter, such as pomace, pelts, stems, &c., to pass between them, but press against each other with such force as to prevent almost wholly the passage of juice between them. Blocks G G', faced with rubber and shaped to closely fit the surfaces of the rollers, are secured to the frame-rails A² at the ends of the cylinders to form dams at each end of the trough between the rollers and prevent the escape of juice or other matter at the sides of the machine. The block G' is provided with an opening just above the angle formed by its curved lower sides, through which the cider or wine may escape into the funnel of the spout F, by which it is conveyed away from the machine. The cylinders E E' are each secured to shafts $e\ e'$, journaled in boxes $e^2\ e^3$, secured to the rail $A^3$ of the frame. The box $e^2$ is secured directly to the frame by set-screws, and is provided with an extension that passes beneath the box $e^3$, and is formed with a recess, into which a dovetailed projection from the box $e^3$ enters, and is held securely down to the rail. The bearing of the box $e^3$ is by this means capable of being adjusted relatively to the bearing of the box $e^2$ by means of a set-screw, $e^4$, that passes through a knee-plate, $e^5$, secured to the rail $A^3$, and the roller $E'$ is thereby forced with any required pressure against the opposite roller $E$. The grinding and compression rollers are operated by means of a crank, $H$, secured to the end of the shaft $c'$. A gear-wheel, $I$, is also secured to the shaft $c'$, which meshes with a smaller wheel, $K$, upon the end of a shaft, $K'$, that crosses the frame, and is provided with a balance-wheel, $K^2$, by which means a regularity of movement is obtained. The rollers $E\ E'$ are provided with spur-wheels $E^2\ E^2$ upon the outer ends of their shafts, which mesh with each other and revolve the rollers $E\ E'$ toward each other in the direction of the arrows. One of the wheels, $E^2$, is driven by the wheel $K$ upon the fly-wheel shaft, by which means the upper surfaces of the cylinders $C\ C'$ and upper surfaces of the compression-rollers $E\ E'$ will each turn toward the other in such manner that any material resting upon their upper surfaces will be drawn between the rolls and cylinders and fall below them. The lower surfaces of the rollers $E\ E'$ are each run in contact with scrapers $c^2\ c^2$, that extend across from one side of the frame to the other, so that any adhering matter may be removed by them. An endless belt, $L$, passes around rollers $L'\ L^2$, one of which, $L'$, is provided with a pulley upon its end, that is driven by a belt, $l$, from a pulley, $e^3$, upon the shaft of roller $E$. The endless belt will by this means be caused to pass beneath the rollers and carry the refuse matter away from the machine.

The cylinder $C'$ may be driven by the cylinder $C$ through the spiral knives of the cylinders intermeshing with each other, or they may be driven by gear-wheels of equal diameters secured to their shafts and meshing with each other.

When the machine is used for a wine-press the bladed or fluted cylinder $C'$ may be removed and a plain-surfaced cylinder substituted therefor. The grapes will then be fed between the cylinders and delivered to the compression-rollers regularly, and will not be macerated and freed from their juice until they reach the compression-rollers.

What I claim as my invention is—

1. The combination and arrangement of the cylinders $C\ C'$, provided with knives arranged spirally in opposite directions around the cylinders to intermesh with each other, and at sufficient distance one from the other to admit of the passage of the fruit between them, so that the blades of one cylinder will cut the fruit that rests in the trough formed between the knives of the other cylinder and deliver the macerated fruit in regulated quantities to compression-cylinders $E\ E'$, arranged beneath them, substantially as described.

2. The combination of the frame $A$, hopper $B$, cylinder-casing $B'$, spout $B^2$, crushing-cylinders $C\ C'$, compression rubber cylinders $E\ E'$, arranged below the spout $B^2$, and the endless belt $L$, the shafts of the revolving parts being driven by gear-wheels or belts with relation to each other, in the manner and for the purpose substantially as described.

3. The combination of the frame, the hopper, the cylinders $C\ C'$, the rubber compression-rollers $E\ E'$, arranged as described, and the dam-blocks $G\ G'$, arranged at the ends of the rollers, and one of which is provided with an opening that communicates with the spout $F$, in the manner and for the purpose substantially as described.

4. The combination of the frame, the hopper $B$, the cylinder-casing $B'$, and the spout $B^2$, provided with perforations, through which the juice of the fruit may pass freely from the spout arranged above the compression-cylinders, substantially as described, for the purpose specified.

The above specification of my invention signed by me this 24th day of March, A. D. 1880.

ALEXANDER C. BELL.

Witnesses:
 THOS. T. GALLAGHER,
 R. J. HOFFMAN.